(12) United States Patent
Wu et al.

(10) Patent No.: US 12,293,134 B2
(45) Date of Patent: May 6, 2025

(54) VOICE ASSISTED REMOTE SCREEN SHARING

(71) Applicant: Citrix Systems, Inc., Fort Lauderdale, FL (US)

(72) Inventors: Hao Wu, Nanjing (CN); Taodong Lu, Nanjing (CN); Yu Xin, Nanjing (CN)

(*) Notice: Subject to any disclaimer, the term of this patent is extended or adjusted under 35 U.S.C. 154(b) by 646 days.

(21) Appl. No.: 17/534,603

(22) Filed: Nov. 24, 2021

(65) Prior Publication Data

US 2023/0126163 A1    Apr. 27, 2023

Related U.S. Application Data

(63) Continuation of application No. PCT/CN2021/125229, filed on Oct. 21, 2021.

(51) Int. Cl.
| | |
|---|---|
| G10L 15/26 | (2006.01) |
| G06F 3/14 | (2006.01) |
| G06F 3/16 | (2006.01) |
| G10L 15/22 | (2006.01) |

(52) U.S. Cl.
CPC ............ *G06F 3/167* (2013.01); *G06F 3/1423* (2013.01); *G10L 15/22* (2013.01); *G10L 15/26* (2013.01); *G10L 2015/223* (2013.01)

(58) Field of Classification Search
CPC ........... H04N 7/15; G06F 3/167; G06F 40/35; G10L 15/26
See application file for complete search history.

(56) References Cited

U.S. PATENT DOCUMENTS

| | | | |
|---|---|---|---|
| 9,225,936 B2* | 12/2015 | Bastide | H04N 7/15 |
| 9,372,543 B2* | 6/2016 | Lo | G06F 3/0481 |
| 11,769,504 B2* | 9/2023 | Flores | G06F 3/167 |
| | | | 704/235 |
| 11,947,894 B2* | 4/2024 | Tumbde | G06V 20/00 |
| 2013/0311177 A1* | 11/2013 | Bastide | H04N 7/15 |
| | | | 704/235 |
| 2018/0144744 A1* | 5/2018 | Badarinath | G10L 15/22 |
| 2021/0286867 A1 | 9/2021 | Zheng | |
| 2022/0350954 A1* | 11/2022 | Tumbde | G06F 40/30 |
| 2022/0368745 A1* | 11/2022 | Rajendran | H04L 65/75 |

FOREIGN PATENT DOCUMENTS

| | | | | |
|---|---|---|---|---|
| CN | 105892815 A | | 8/2016 | |
| CN | 112233669 A | | 1/2021 | |
| CN | 109669657 B | * | 6/2023 | ........... G06F 3/1454 |

OTHER PUBLICATIONS

International Search Report and Written Opinion issued in App. No. PCT/CN2021/125229, mailing date Jul. 20, 2022, 9 pages.

\* cited by examiner

*Primary Examiner* — Daniel Abebe

(57) ABSTRACT

According to some embodiments, a method includes: receiving, by a client device, speech of a user during a screen sharing session; transcribing, by the client device, the speech into text; analyzing, by the client device, the text to identify one or more UI elements referenced within the speech, the one or more UI elements visible within the screen sharing session; and highlighting the one or more UI elements visible on the client device.

17 Claims, 10 Drawing Sheets

VOICE ASSISTED REMOTE SCREEN SHARING

CROSS REFERENCE TO RELATED APPLICATIONS

This application is a continuation of and claims the benefit of PCT Patent Application No. PCT/CN2021/125229 filed on Oct. 21, 2021 in the English language in the State Intellectual Property Office and designating the United States, the contents of which are hereby incorporated herein by reference in its entirety.

BACKGROUND

Screen sharing enables a user to share digital content displayed on their local computing device with users of other, remote computing devices in real-time or near real-time. For example, a user can share their entire screen, a particular application, or a particular application window with other users. Various online meeting and conferencing services, such as TEAMS, SKYPE, ZOOM, GOTOMEETING, and WEBEX, provide screen sharing capabilities in addition to audio and video conferencing. Using such services, a user ("the presenter") can share applications/windows on their computing device with one or more other users ("audience members" or "the audience") while simultaneously engaging in discussion with the audience.

SUMMARY

With existing applications and services that provide screen sharing, it can be difficult for a presenter to interact with applications running on their local computing device while at the same reacting to verbal instructions/questions from the audience. For example, if a presenter is demonstrating features of an application during a screen sharing session and an audience member asks the presenter to interact with a particular user interface (UI) element of the application (e.g., click on a particular button or menu item), it may take the presenter several seconds to locate the UI element on their screen before they are able to interact with it. Even short delays can add up and significantly extend the duration of the screen sharing session. This can lead to a loss of user productivity for both the presenter and for the audience members. It can also lead to an increase in computing resource usage, for example increased networking and processing usage by the screen sharing application as a result of longer meeting durations. Although some existing online meeting services allow the presenter to hand over control of their computing device to an audience member, this may be undesirable due to the security implications. Embodiments of the present disclosure can address the aforementioned technical problems by automatically monitoring the speech of one or more users during a screen sharing session and, based on an analysis of the speech, automatically locating and highlighting application UI elements referenced within the speech.

According to one aspect of the disclosure, a method can include: receiving, by a client device, speech of a user during a screen sharing session; transcribing, by the client device, the speech into text; analyzing, by the client device, the text to identify one or more UI elements referenced within the speech, the one or more UI elements visible within the screen sharing session; and highlighting the one or more UI elements visible on the client device.

In some embodiments, the speech may be received from a remote client device during the screen sharing session. In some embodiments, the method can further include: enumerating a plurality of applications visible within the screen sharing session, wherein the analyzing may include searching one or more of the plurality of applications for the one or more UI elements referenced within the speech. In some embodiments, the method can further include: determining that a first application from the plurality of applications is referenced within the speech, wherein the searching may include searching only the first application. In some embodiments, the method can further include: determining that no application from the plurality of applications is referenced within the speech, wherein the searching may include searching each of the plurality of applications. In some embodiments, enumerating the plurality of applications visible within the screen sharing session may include excluding applications that have a window size less than a threshold window size. In some embodiments, the analyzing can include: enumerating UI elements of the one or more of the plurality of applications; and identifying one or more UI element attributes referenced in the speech, wherein the searching may include filtering the enumerated UI elements based on the one or more UI element attributes referenced in the speech.

According to one aspect of the disclosure, a computing device can include: a processor and a memory storing computer program code that when executed on the processor causes the processor to execute a process, the process corresponding to any of the embodiments described above.

According to one aspect of the disclosure, a non-transitory machine-readable medium may encode instructions that when executed by one or more processors cause a process to be carried out, the process corresponding to any of the embodiments described above.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
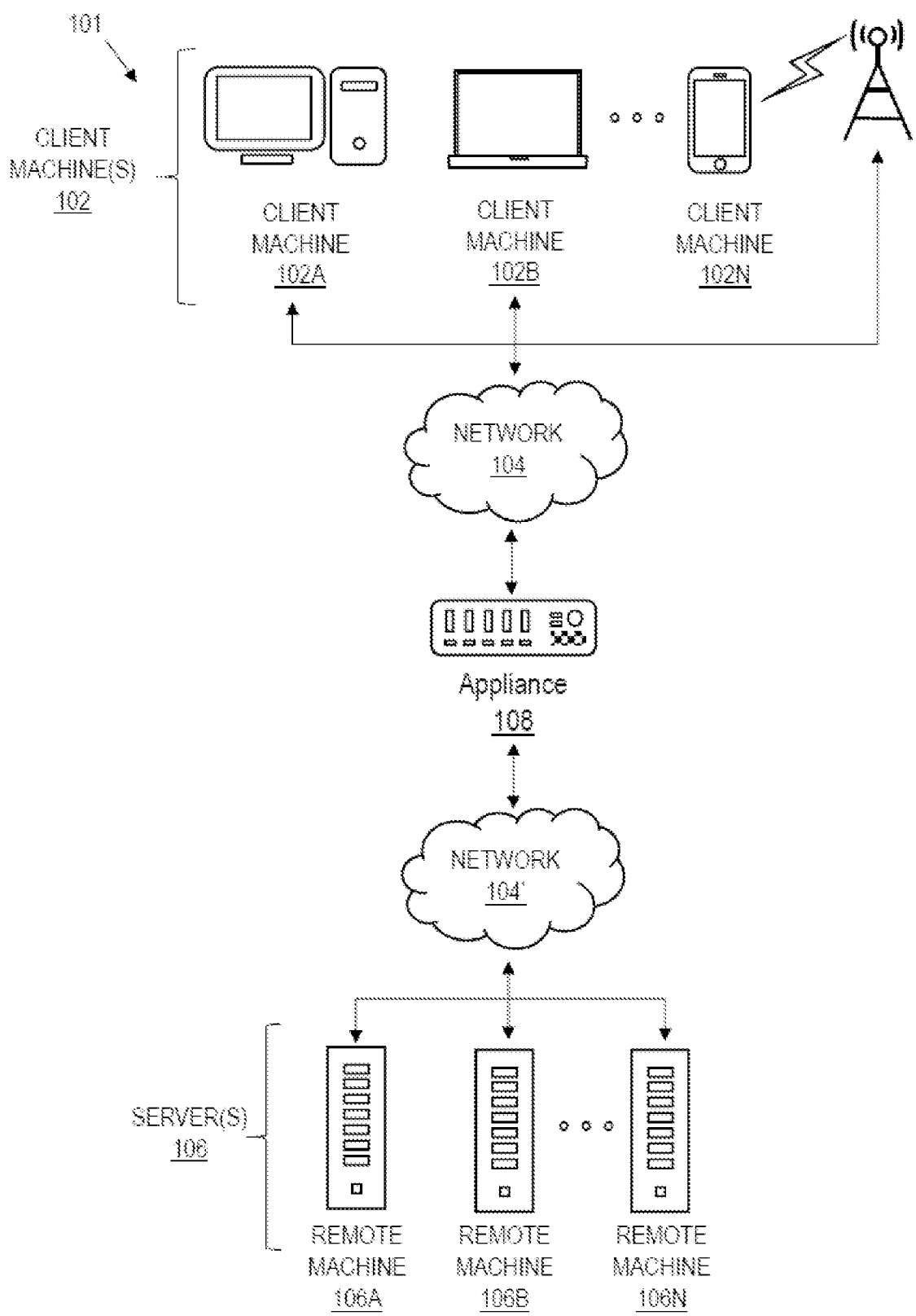
FIG. 1 is a diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
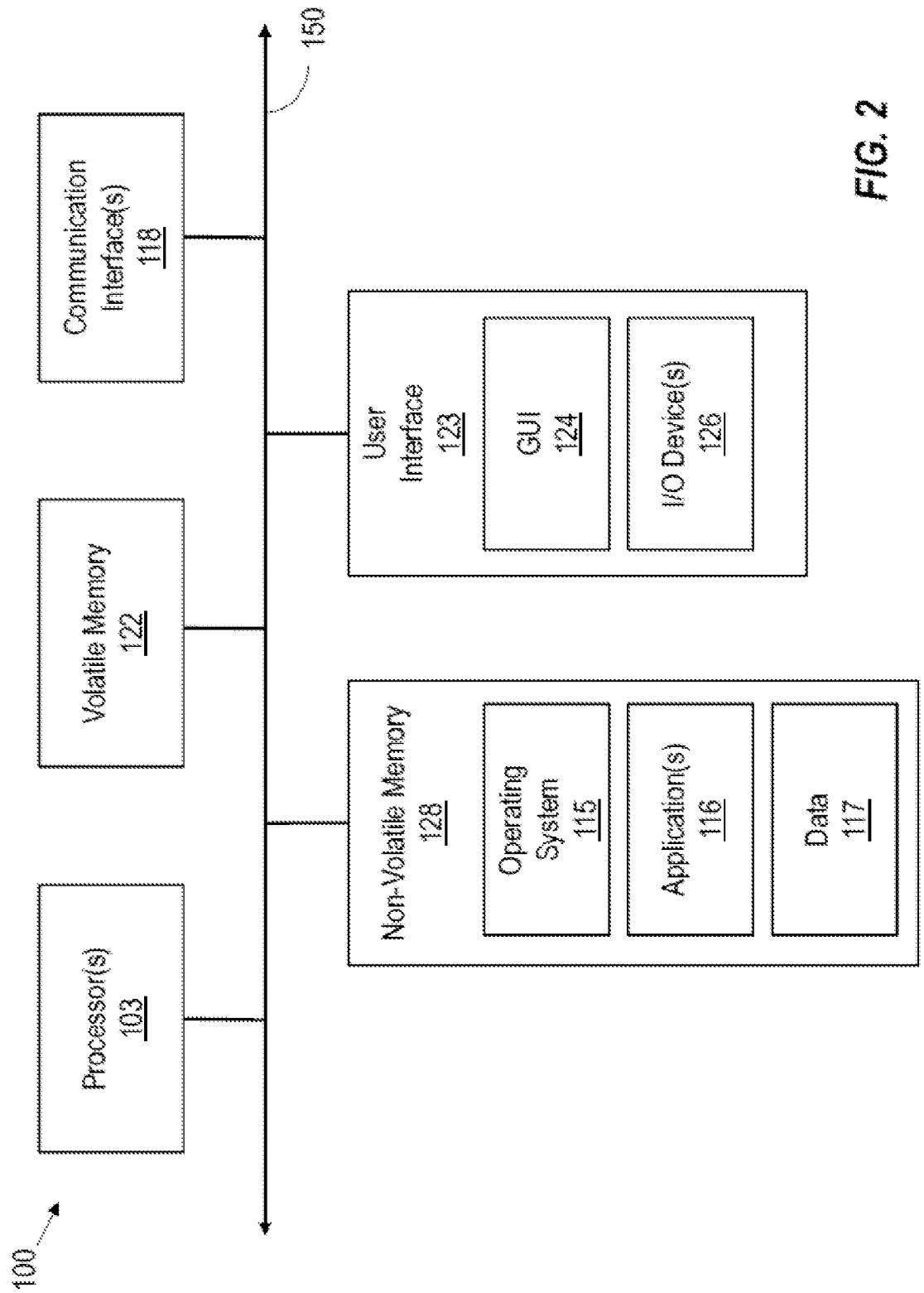
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more loudspeakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
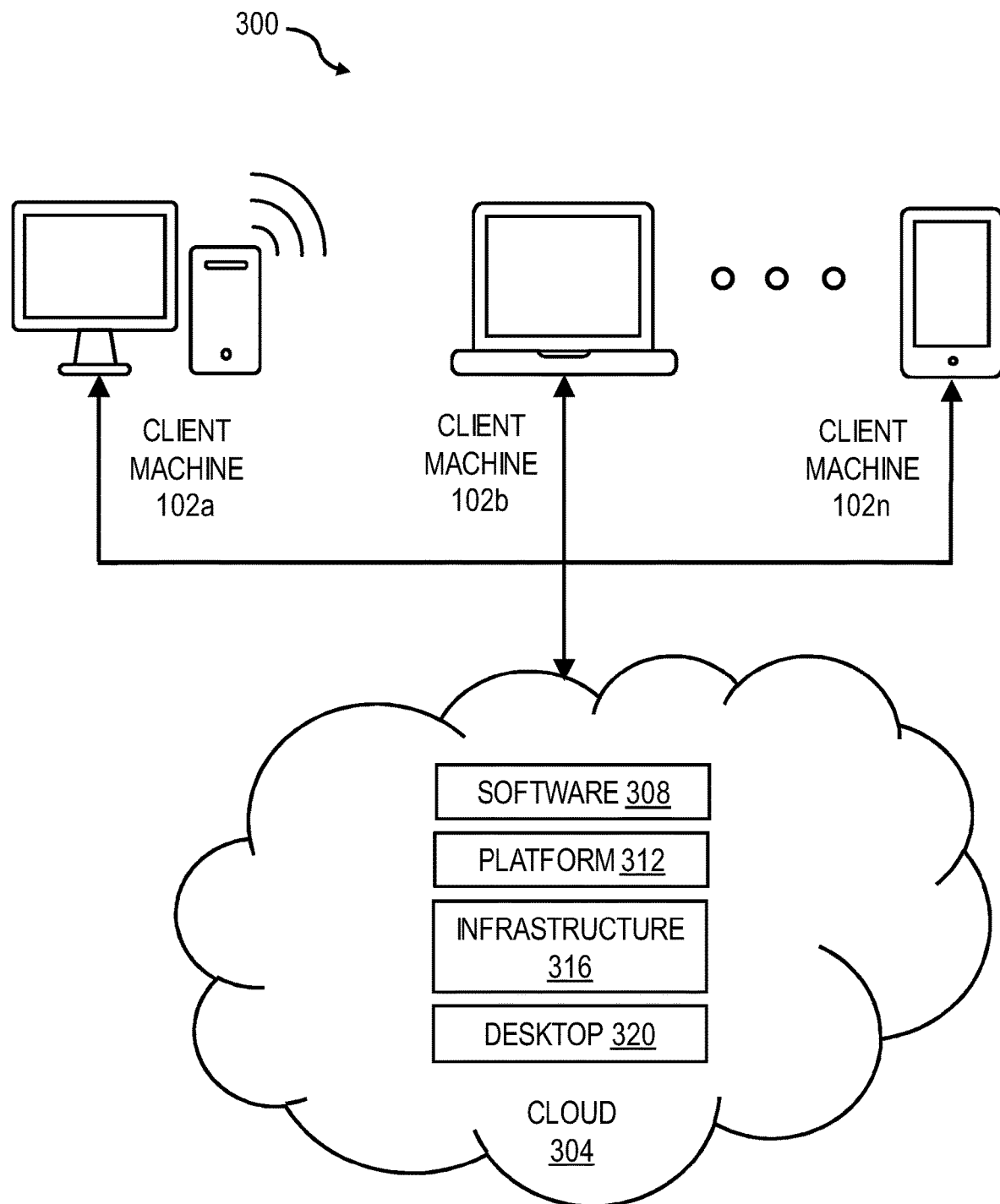
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multitenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
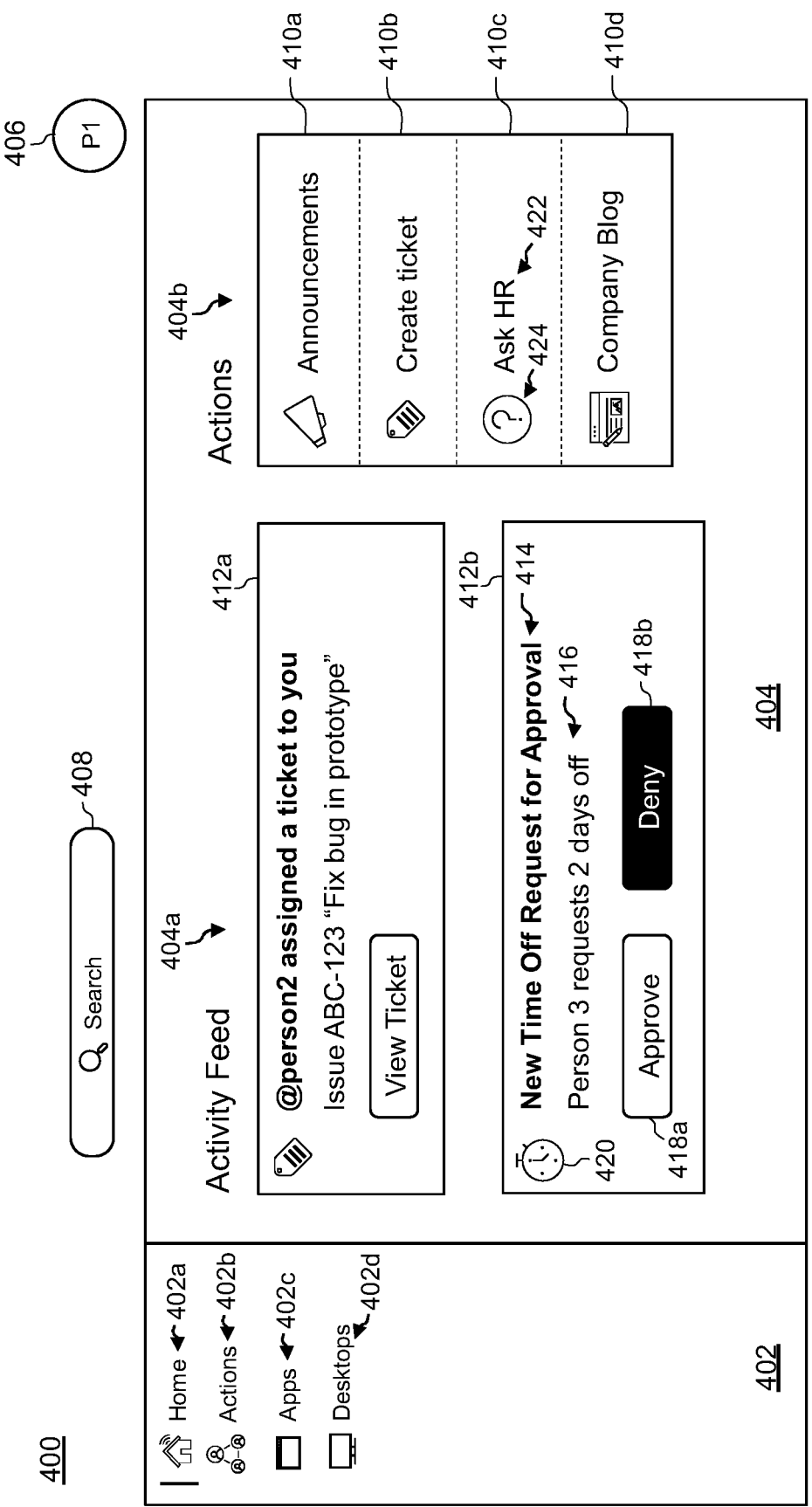
FIGS. 4A and 4B are user interface (UI) diagrams showing an example of voice assisted remote screen sharing, according to some embodiments of the present disclosure.
Figure 4B:
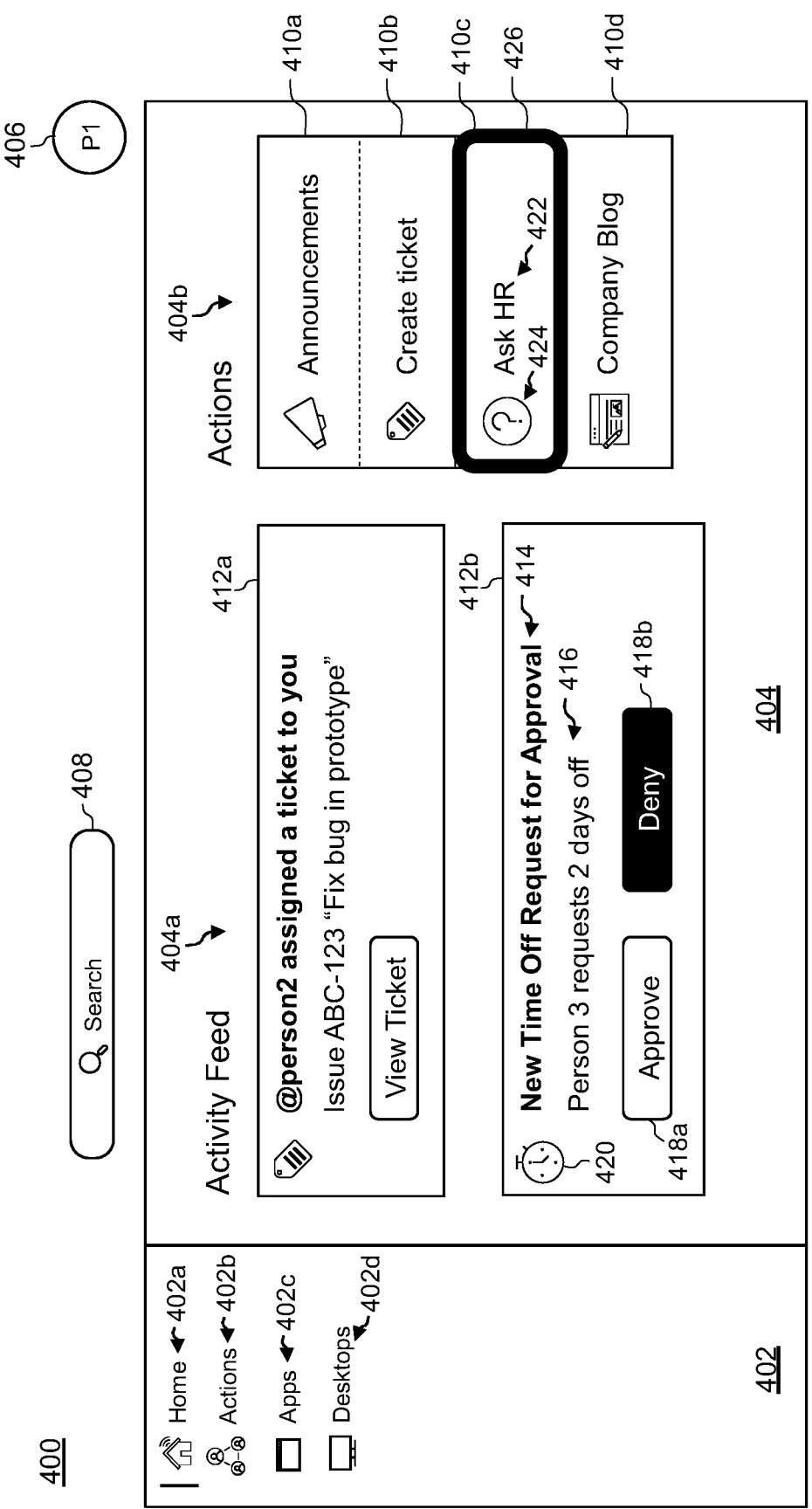

FIGS. 4A and 4B illustrate how a user interface (UI) element of an application can be automatically highlighted during a screen sharing session based on a user's speech, according to some embodiments of the present disclosure. An illustrative UI 400 may correspond to portions of a UI used by a resource access application, such as the CITRIX WORKSPACE application. However, the disclosed voice assistance techniques can be generally used in conjunction with any type of application including mobile applications, desktop applications, SaaS applications, etc. The application may be running on client device of a first user ("presenter") who is sharing their screen with one or more other users ("audience members" or "the audience").

Referring to FIG. 4A, the illustrative UI 400 includes a resource menu 402, a content view 404, a search box 408, and an icon 406 to identify the user of the resource access application (e.g., the user authenticated with the resource access application). In the example shown, it is assumed that "person1" or "P1" is using the resource access application 406. That is, "P1" may denote the user who is presenting and sharing their screen with one or more audience members. In the example shown, resource menu 402 can include a home menu item 402a, an actions menu item 402b, and a desktops menu item 402d. In response to the user selecting (e.g., clicking or tapping on) a particular menu item 402, the contents of content view 404 may change to provide access to corresponding functionality of the resources access application. In more detail, the UI elements displayed within content view 404 may change depending on which menu item 402 is selected.

As used herein, the term "UI element" refers to any discrete portion of a UI including but not limited to a label, a button, a text input, a checkbox, a radio button, a scrollbar, a menu item, a panel, a container, etc. A UI element can include other UI elements (i.e., UI elements can be nested). For example, in applications that utilize HTML to generate the UI (e.g., web-based applications), a <form> element may include <input> elements, <label> elements, <button> elements, etc. As another example, <div> element in HTML may include <form> elements, other <div> elements, etc. A UI element that includes one or more other UI elements may be referred to as a "parent" or "ancestor" element and its included UI elements may be referred to as "child" or "descendant" elements. In this way, a UI (or a portion thereof) may be represented using a tree structure. In the case of web- or HTML-based applications, the tree structure may correspond to a Document Object Model (DOM).

A UI element may have one or more attributes or properties. Such attributes may be explicitly defined within the UI or may be derived based on a current state of the UI. For example, a UI element may be assigned one or more "identity" attributes (e.g., an "id" attribute, a "name" attribute, etc.) that can be used to identify—and perhaps uniquely identify—the UI element within its application. As another example, a UI element may have a "type" attribute that determines various behavior and visual characteristics of the UI element. In HTML, a UI element type may be specified by the HTML tag used to declare the UI element (e.g., <div>, <form>, <input>, etc.). As another example, a UI element can be assigned one or more "style" attributes that determine how the UI element is visually rendered/displayed on screen. Examples of style attributes include foreground color, background color, font family, font size, text color, border style, border size, border color, etc. As another example, UI elements may also have one or more "positional" attributes that determine where the UI element is rendered on screen. A positional attribute may specify a position/location of a UI element relative to one or more other UI elements. For example, a UI element can be positioned relative to a top-level application window or relative to other UI elements of the application.

Various other UI technologies include the concept of UI elements. Examples include HTML for web-based applications, the WINDOWS UI library and WINDOWS TEMPLATE LIBRARY for WINDOWS applications, and the COCOA and APPKIT frameworks for MACOS applications. For ease of explanation, embodiments of the present disclosure may be described using examples of HTML elements, however the structures and techniques sought to be protected herein can be generally applied to any UI technology/framework.

With continued to reference to FIG. 4A, in response to the user clicking on the home menu item 402a, the content view 404 may show an activity feed 404a for the user along with a list of actions 404b the user can take. In more detail, content view 404 may include (i.e., have as children/descendants) several UI elements that collectively comprise the activity feed 404a and the list of actions 404b.

In the example shown, activity feed 404a can include panels 412a, 412b, etc. (412 generally) to display notifications or other types of activities associated with the user's account. An illustrative notification panel 412b can include, for example, a first label 414 displaying a title for the notification, a second label 416 displaying a description of the notification, buttons 418a, 418b corresponding to actions that the user can take in regards to the notification, and an icon 420 providing an additional visual indicator for the notification. Each of the notification panels 412 along with the elements included therein (e.g., elements 414, 416, 418a, 418b, 420) are examples of distinct UI elements for purpose of this disclosure. Notification panels 412 may be declared or otherwise treated as children/descendants of activity feed 404a within the UI 400. Likewise, UI elements 414, 416, 418a, 418b, 420 may be declared or otherwise treated as children/descendants of notification panel 412b.

As also show in the example of FIG. 4A, the list of actions 404b can include buttons 410a, 410b, 410c, 410d, etc. (410 generally) corresponding to particular actions that the user can take. An illustrative action button 410c can include, for example, a label 422 displaying a title for the action (e.g., "Ask HR") and an icon 424 providing an additional visual indicator for the action. Each of the action buttons 410 along with the elements included therein (e.g., elements 422 and 424) are further examples of distinct UI elements for purpose of this disclosure. A given application UI can include an arbitrary number of UI elements (e.g., hundreds or thousands of UI elements). Buttons 410 may be declared or otherwise treated as children/descendants of the list of actions 404b. Likewise, UI elements 424, 422 may be declared or otherwise treated as children/descendants of action button 410c.

Turning to FIG. 4B, as the presenter is demonstrating the application UI 400 on their client device, UI 400 may be displayed on remote client devices of one or more audience members via screen sharing (e.g., using screen sharing capabilities of TEAMS, SKYPE, ZOOM, GOTOMEETING, WEBEX, etc.). While the presenter is demonstrating the application UI 400, an audience member may verbally instruct the presenter to interact with a particular UI element included therein. For example, an audience member may verbally ask the presenter to "click on the Ask HR button," "tap on the Ask HR button," "go to the Ask HR page," or some other instruction that refers to UI element 410c, which includes the "Ask HR" label 422. In more detail, the audience member may speak such instructions into a microphone connected to their client device, the speech may be transmitted to the presenter's client device and then played back to the presenter using a loudspeaker (e.g., a headset or external speakers) connected to the presenter's device.

To assist the presenter with locating an application UI element referenced by the audience member's, embodiments of the present disclosure can automatically analyze the audience member's speech and, based on this analysis, attempt to locate (e.g., search for) the referenced UI element on the presenter's client. If the UI element is located on the presenter's client, embodiments of the present disclosure can highlight the UI element to increase its visibility to the presenter (e.g., to make it more conspicuous to the presenter). This can result in increased productivity for both the presenter and the audience. It can also reduce the duration of the screen sharing session which, in turn, can result in reduced networking and processing usage (i.e., improved network, system, and/or device efficiency).

In the example of FIG. 4B, a highlight 426 may be automatically added to UI element 410c in response to the audience member's speech (e.g., in response to the audience member saying "click on the Ask HR button"). As used herein, the term "highlight" can refer to any visual indicator that makes a referenced UI element more visible or conspicuous to a user. A highlight can be applied to a UI element, for example, by adding or changing one or more style attributes of the UI element. In the example of FIG. 4B, highlight 426 may correspond to a border that is added around referenced UI element 410c. The border may be assigned a width/thickness that is substantially greater than that of other borders used within the application UI 400. In some embodiments, a highlight may be applied by assigning the UI element a color (e.g., a foreground, background, and/or border color) that contrasts with other colors used within the application UI 400, such as a color that has a substantially different hue, value, or intensity compared to other colors used within UI 400. For example, a bright blue or green color may be used in some cases. In some embodiments, a highlight may correspond to a semitransparent overlay positioned on top of a UI element. In some embodiments, a highlight may correspond to one or more new UI element that are added to the application's UI. For example, one or more UI elements that form the shape of an arrow pointing toward a UI element may be added to the application's UI for the purpose of highlighting the UI element. In some embodiments, a highlight may include a visual effect, such as an animation.

Various structures and techniques that can be used to automatically locate and highlight UI elements referenced by users during a screen sharing session are described below in the context of FIGS. 5, 6, 7, 7A, and 7B. While FIGS. 4A and 4B show an example of a graphical user interface (GUI), disclosed embodiments can be used to highlight UI elements in other types application UI's such as command line interfaces (CLIs) and other text-based UI's.

Figure 5:
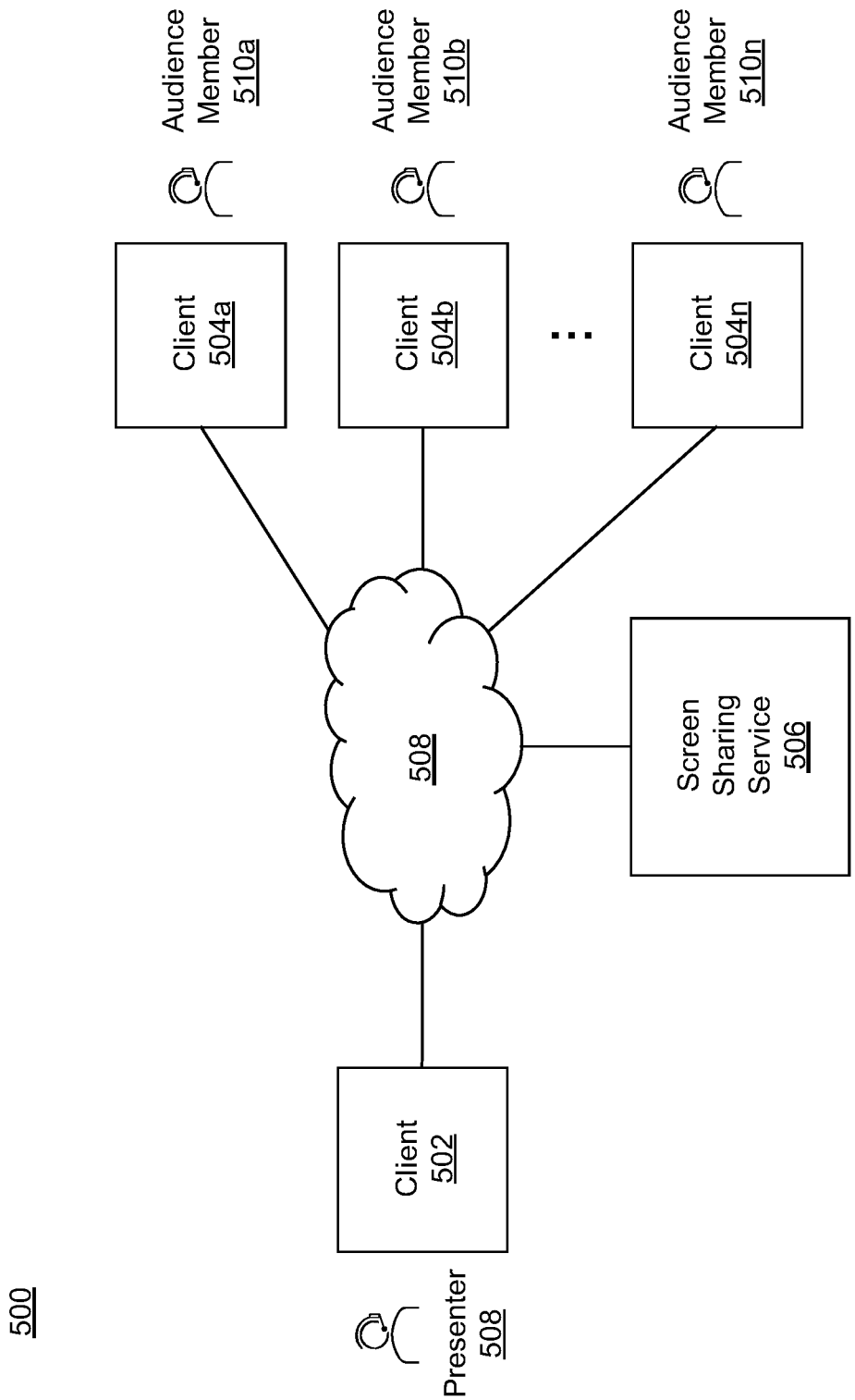
FIG. 5 is a diagram of an illustrative network environment for voice assisted remote screen sharing, according to some embodiments of the present disclosure.

FIG. 5 shows an example of a network environment in which voice assisted remote screen sharing can be implemented, according to embodiments of the present disclosure. An illustrative network environment 500 includes a first client 502, one or more second clients 504a, 504b, . . . , 504n, etc. (504 generally), and a screen sharing service 506. Clients 502, 504 may be configured to communicate with the screen sharing service 506 via one or more computer networks 508 (e.g., via the Internet). In some embodiments, clients 502, 504 may communicate directly with each other, e.g., using peer-to-peer (P2P) communication, as discussed further below.

In the example of FIG. 5, a presenter 508 can use first client (or "presenter client") 502 to share their screen with one or more audience members 510a, 510b, . . . , 510n (510 generally) using respective second clients (or "audience member clients") 504a, 504b, . . . , 504n. Clients 502, 504 can include, for example, desktop computing devices, laptop computing devices, tablet computing devices, and/or mobile computing devices. Clients 502, 504 can be configured to run one or more applications, such as desktop applications, mobile applications, and SaaS applications. Among various other types of applications, clients 502, 504 can run an application that provide screen sharing functionality (referred to generally as a "screen sharing application"). For example, clients 502, 504 can run an online meeting application—such as TEAMS, SKYPE, ZOOM, GOTOMEETING, or WEBEX—that provides screen sharing. The screen sharing application running on clients 502, 504 can communicate with screen sharing service 506 and/or with screen sharing applications running on other clients 502, 504 (e.g., using P2P communication). An example of a client that may be the same as or similar to presenter client 502 and/or any of audience member clients 504 is described below in the context of FIG. 6. In some embodiments, a client 502, 504 may be the same or similar to a client machine 102A-102N of FIG. 1 and/or FIG. 3.

Screen sharing service 506 may correspond to any service that enables presenter client 502 to share its screen with audience member clients 504. For example, screen sharing service 506 may correspond to an online meeting service such as TEAMS, SKYPE, ZOOM, GOTOMEETING, WEBEX, etc. In some embodiments, screen sharing service 506 may correspond to a SaaS application running in the cloud (e.g., within cloud network 304 of FIG. 3). In some embodiments, screen sharing service 506 may be omitted and screen sharing applications running on clients 502, 504 may directly communicate with each other using P2P communication.

Presenter client 502 can establish a screen sharing session with audience member clients 504 via screen sharing service 506 (or, in some embodiments, directly using P2P). Presenter 508 can share an entire screen visible on client 502 with audience members 510, meaning that any applications that are visible on the presenter's screen are also visible on audience member clients 504. Alternatively, presenter 508 can share individual applications, or individual application windows, with audience members 510.

During a screen sharing session, audience members 510 may verbally ask/instruct the presenter 508 to interact with a particular UI element that is part of an application UI (e.g., UI 400 of FIGS. 4A and 4B) that is screen shared by presenter client 502. In more detail, an audience member 510 may speak into a microphone connected to their client 504, the speech (e.g., a digital representation of the speech) may be transmitted to the presenter client 502 via the one or more computer networks 508, and then played back to the presenter 508 using a loudspeaker connected to the presenter client 502. Using the techniques and structures disclosed herein, presenter client 502 may automatically analyze the audience member's speech to identify one or more application UI elements referenced therein, and then may attempt to locate the referenced UI element on the presenter's client 502. If the UI element is located, presenter client 502 can automatically highlight the referenced UI element on the presenter client 502.

Figure 6:
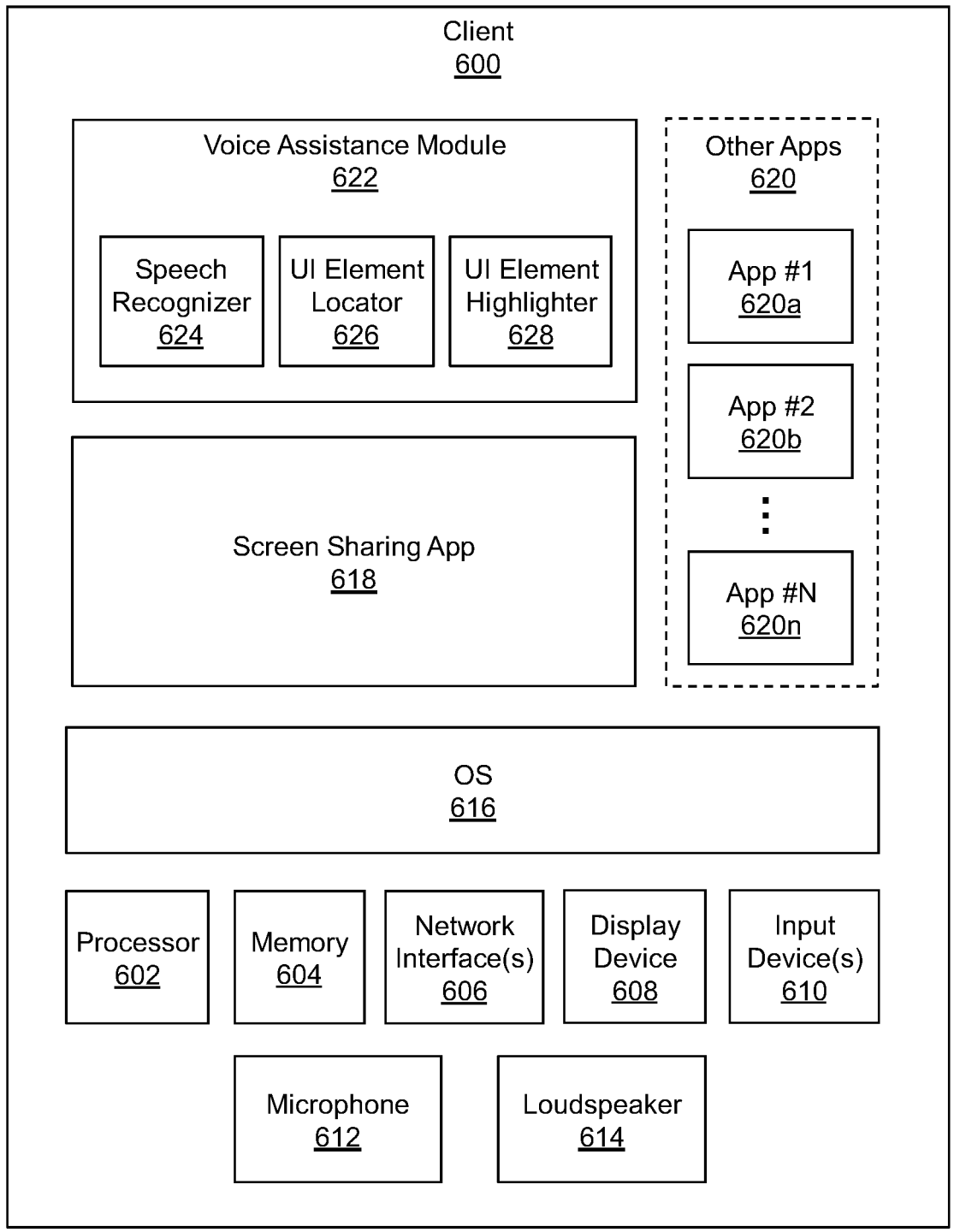
FIG. 6 is a block diagram of an illustrative client that can be used within the network environment of FIG. 5, according to some embodiments of the present disclosure.

FIG. 6 shows an illustrative client 600 that can be used within the network environment of FIG. 5. For example, client 600 can correspond to presenter client 502 and/or any of audience member clients 504 of FIG. 5. The illustrative client 600 can include a processor 602, a memory 604, one or more network interfaces 606, a display device 608, and one or more input devices 610, a microphone 614, and a loudspeaker 614. Memory 604 can store executable instructions for an operating system (OS) and one or more applications, and processor 602 can be configured to execute/run the OS and applications using the stored executable instructions. Display device 608 may be provided, for example, as a monitor or a touchscreen device. Input devices 610 may include, for example, a mouse, a touchpad, a touchscreen, or a stylus. Microphone 612 can include to any device that converts sound (e.g., speech) into an audio signal and loudspeaker 614 can include any device that converts an audio signal into a corresponding sound. In some embodiments, microphone 612 and loudspeaker 614 may be collected provided as a headset or as headphones. Display device 608, input devices 610, microphone 612, and/or loudspeaker 614 can be included as parts of the client 600 or can otherwise be connected thereto.

Client 600 can further include an OS 616, a screen sharing application 618, and one or more other applications 620a, 620b, . . . , 620n (620 generally). The screen sharing application 618 may correspond to any application that enables client 600 to share its screen with other clients and/or to display screens shared by other clients. In some embodiments, screen sharing application 618 may include an online meeting application such as TEAMS, SKYPE, ZOOM, GOTOMEETING, WEBEX, etc. Screen sharing application 618 may connect to a screen sharing service (e.g., screen sharing service 506 of FIG. 5) via one or more computer networks (e.g., networks 508 of FIG. 5) to establish a screen sharing session with one or more other clients.

Other applications 620 can include any applications configured to run on client 600 besides screen sharing application 618. Each of the other applications 620 may have an identifier (e.g., a name, a path, a numeric identifier, etc.) that identifies the application on the client 600. A given one of the other applications 620 can include a UI having one or more UI elements (e.g., UI 400 of FIG. 4A). Using screen sharing application 618, a user of client 600 can choose to share their entire screen including the UI's of all other applications 620 that are running and visible on the screen. Alternatively, the user can choose to screen share a particular application, meaning that only the UI for that application/window is shared.

In some embodiments, client 600 may include a windowing environment (sometimes referred to a desktop environment) whereby a given application can be displayed within one or more windows. For example, the windowing/desktop environment may be provided by OS 616. Non-limiting examples of OS's that provide windowing environments include WINDOWS, MACOS, CHROME OS, and various LINUX/UNIX distributions. In such embodiments, the user may choose to share particular application windows or groups of application windows. Alternatively, the user may choose to share all application windows visible within the windowing/desktop environment (i.e., visible on screen). At any given time, client 600 may have an arbitrary number of applications (e.g., dozens of applications) that are running and visible on screen, and each application can have an arbitrary number of UI elements (e.g., hundreds or thousands of UI elements). An application, or application window, may be considered "visible" if at least a portion of the application/window is displayed on display device 608 of client 600 (e.g., if it is visible to a user of client 600). Various OS's allow applications to run in the background, sometimes referred to as services, daemon processes, or non-interactive processes. Such running applications may be considered not visible for the purpose of this disclosure. In addition, various windowing/desktop environments allow a user to hide/minimize applications and application windows. Such running applications/windows may also be considered not visible for the purposes of this disclosure. Further, various windowing/desktop environments allow a user to resize application windows (i.e., change width and/or height of application windows). According to some embodiments, an application/window may be considered not visible if it has a dimension (e.g., a width or height) or a size (e.g., an area calculated as the window width multiplied by the window height) that is below a threshold window dimension/size. That is, applications/windows that are particularly small, in terms of a dimensions or size, may be considered to be invisible for the purposes of this disclosure. As discussed in more detail below, in some embodiments, only applications/windows that are both running are visible may be considered when automatically locating and highlighting UI elements based on a user's speech.

Client 600 can further include a voice assistance module 622 configured to automatically locate and highlight UI elements of the other applications 620 based on analysis of received speech. The speech may be captured by a microphone connected to another client, transmitted to client 600 via one or more computer networks (e.g., networks 508 of FIG. 5), and received via network interfaces 606. For example, if client 600 is used by a presenter who is sharing one or more of the other applications 620 with other clients used by audience members, voice assistance module 622 may automatically analyze the audience member's speech received over one or more computer networks via network interfaces 606. In some embodiments, the speech may be received directly from the microphone 612 connected to client 600, meaning that the structures and techniques disclosed can be used to automatically highlight UI elements based on the local user's speech (e.g., based on the presenter's speech, exclusive of or in addition to the audience's speech).

As shown in the embodiment of FIG. 6, voice assistance module 622 can include submodules such as a speech recognizer 624, a UI element locator 626, and a UI element highlighter 628. Speech recognizer 624 can transcribe speech (e.g., words and phrases spoken by a user) into text. In more detail, speech recognizer 624 can receive an audio signal as input and can generate, as output, a list of individual words (e.g., string representations of words) within the speech. For example, if the audience member's speech includes the instructions "click on the Ask HR button," speech recognizer 624 may generate, as output, the following list of words: ["click", "on," "the," "Ask," "HR," "button"]. In some embodiments, speech recognizer 624 can utilize (e.g., include an implantation of) an open-source speech-to-text engine/library such as DeepSpeech. In some embodiments, speech recognizer 624 may utilize (e.g., access) an external speech-to-text service/API such as the GOOGLE CLOUD Speech-to-Text API or the AZURE Speech to Text service.

UI element locator 626 can analyze transcribed text produced by speech recognizer 624 to identify one or more UI elements that are referenced within the speech and that exist within one or more of the other applications 620 or application windows associated therewith. When searching for a UI element, UI element locator 626 may only consider applications/windows that are visible and that are shared by the screen sharing application 618. In some embodiments, UI element locator 626 can analyze the transcribed text to determine a name or other identifier of an application referenced in the speech, and then can compare spoken application identifier to a list of applications shared by screen sharing application 618. In some embodiments, UI element locator 626 can analyze the transcribed text to determine one or more UI element attributes referenced in the speech, and can compare the referenced attributes to attributes of UI elements within one or more of the other applications 620 (or windows associated therewith) shared by screen sharing application 618. Examples of such attributes include identity attributes, type attributes, style attributes, and positional attributes. Examples of techniques that can be used to locate (e.g., search for) application UI elements based on transcribed text are described below in the context of FIGS. 7A and 7B. UI element locator 626 can output information identifying the referenced application and the referenced UI element(s) belonging thereto. For example, UI element locator 626 may output a value that uniquely identifies one of the other applications 620 along with a value that uniquely identifies a UI element of that application.

UI element highlighter 628 can use the information output from UI element locator 626 to automatically highlight one or more UI elements referenced within the speech (e.g., verbally referenced by a user of a remote client). For example, UI element highlighter 628 can alter/add one or more style attributes of the referenced UI element(s) to highlight the UI element(s) on client 600. Other examples of highlighting techniques that can be used are discussed above in the context of FIGS. 4A and 4B.

In some embodiments, voice assistance module 622, or a portion thereof, may be provided as part of, or as a plugin to, screen sharing application 618. In some embodiments, voice assistance module 622, or a portion thereof, may be provided as part of, or as a plugin to, OS 616. In some embodiments, voice assistance module 622 may be provided as a standalone application that interfaces with screen sharing application 618 and/or OS 616 (e.g., using API's or system calls provided thereby) to provide the functionality described herein. In some embodiments, voice assistance module 622, or a portion thereof, may be provided by a remote server, such as an application server running in a cloud computing environment. For example, screen sharing service 506 of FIG. 5 may be adapted or otherwise configured to transcribe an audience member's speech to text and then to transmit the resulting text to client 600 where it can be used to automatically locate and highlight a UI element on the presenter's screen.

Figure 7:
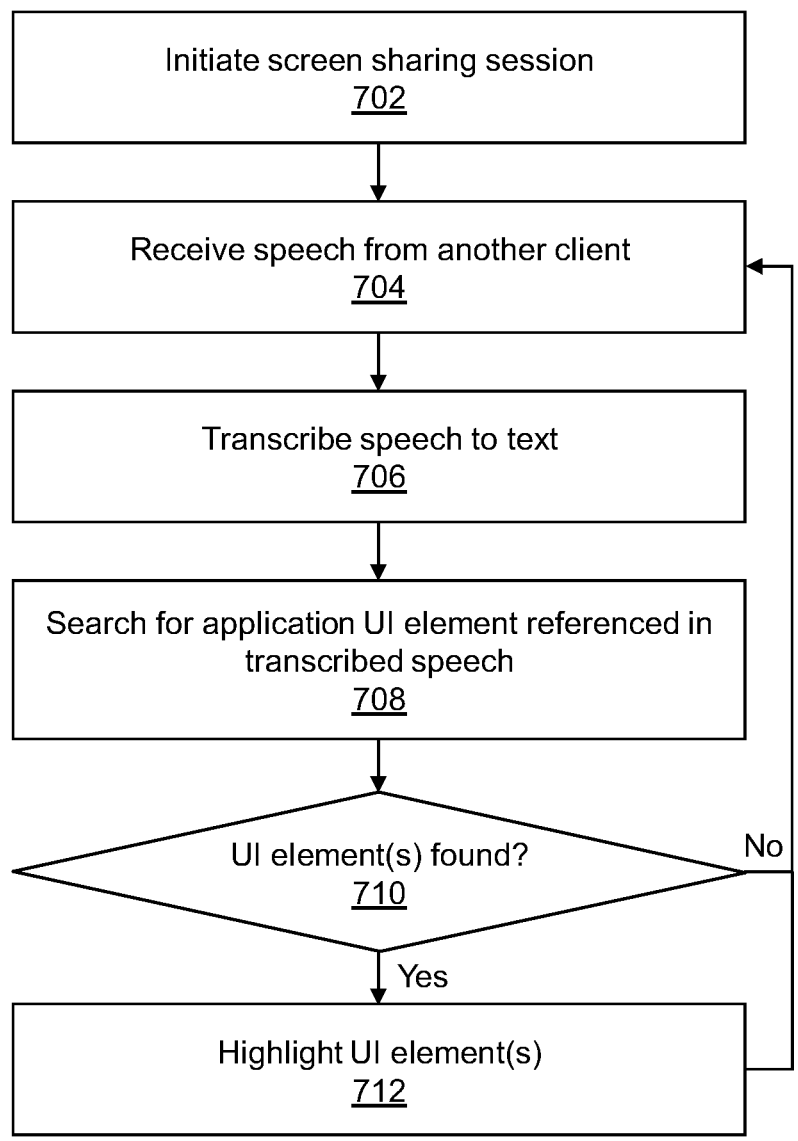
FIGS. 7, 7A, and 7B are flow diagrams of illustrative processes for voice assisted remote screen sharing, according to some embodiments of the present disclosure.
Figure 7A:
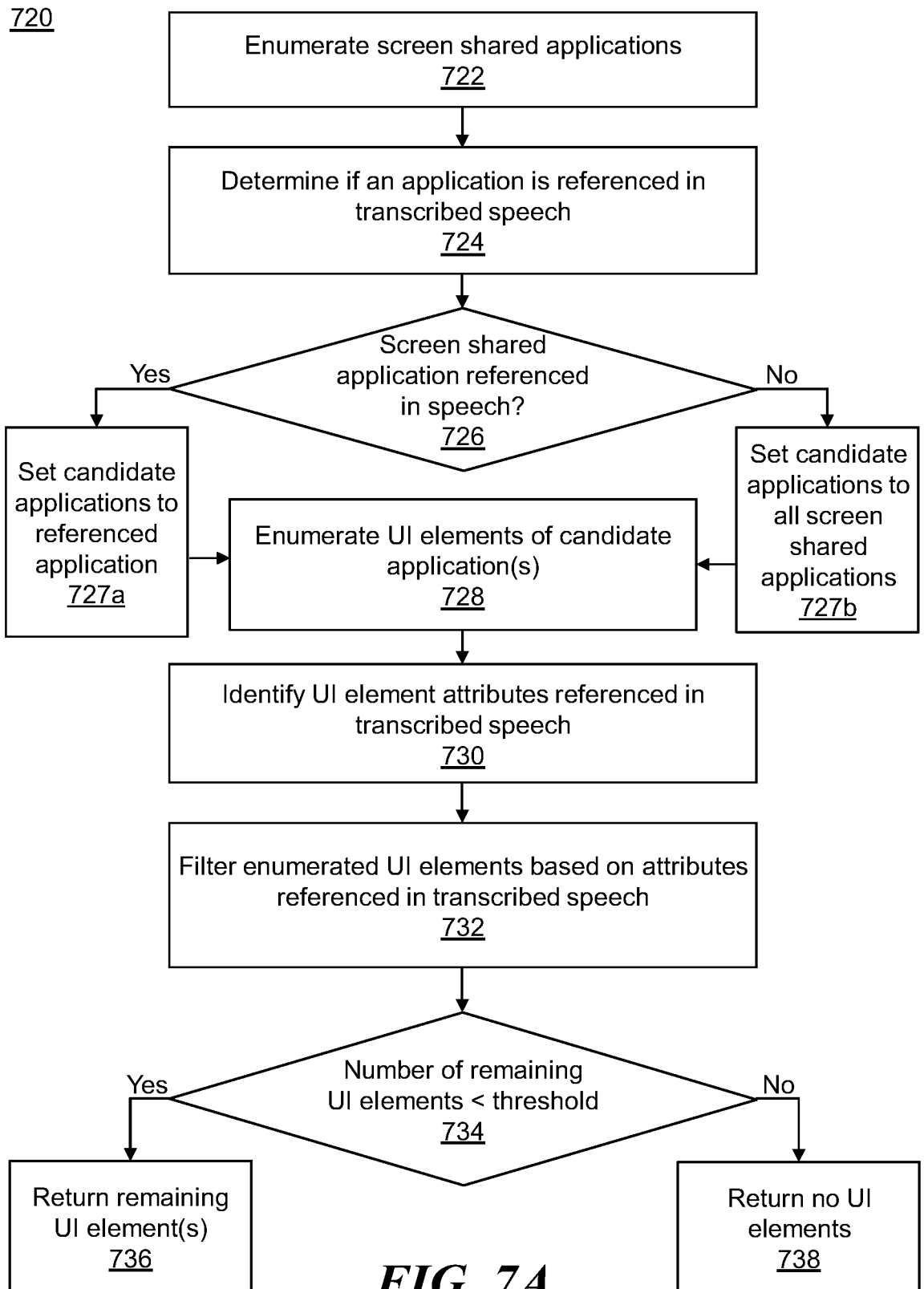
Figure 7B:
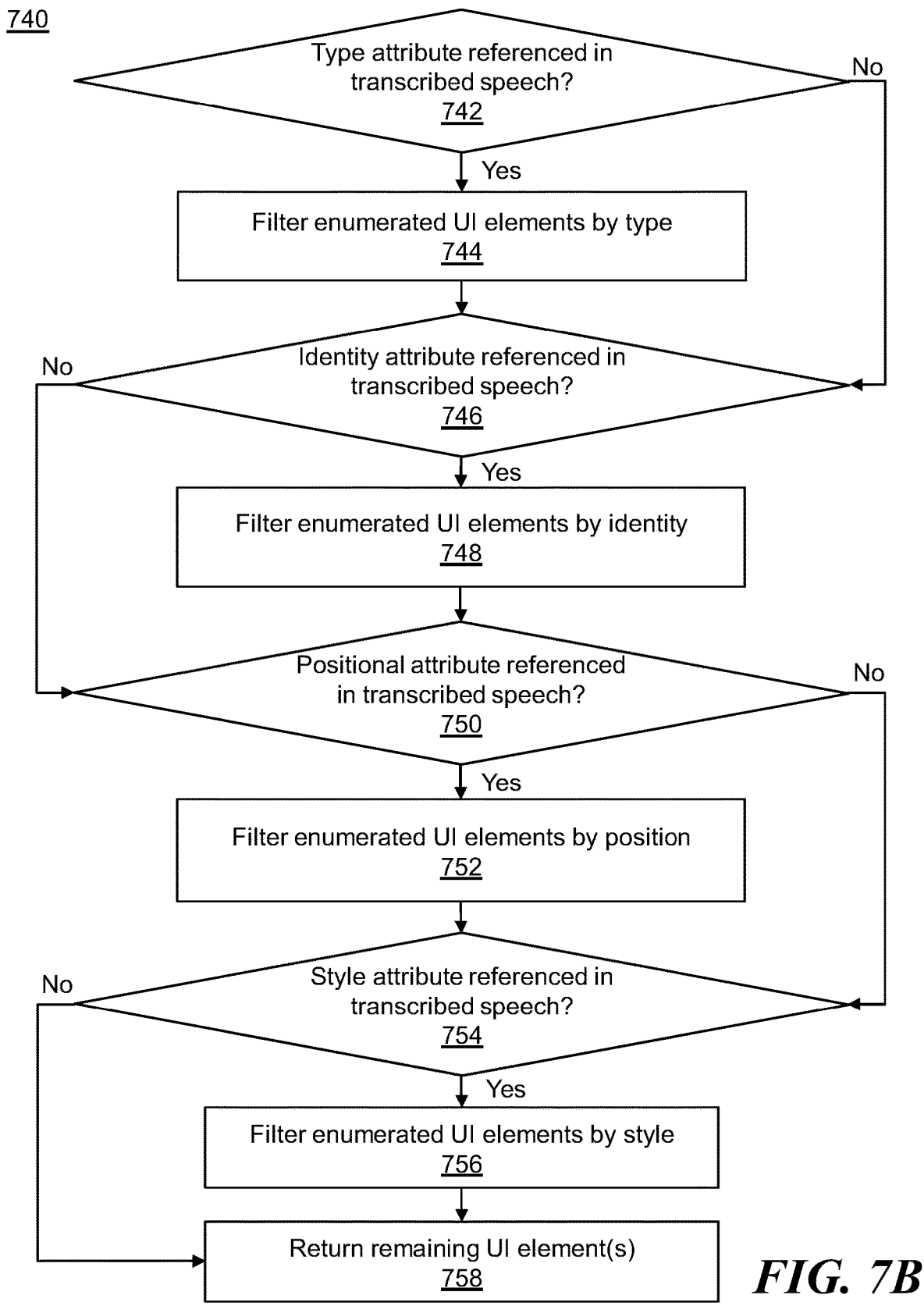

FIGS. 7, 7A, and 7B show examples of processes for voice assisted remote screen sharing that can be implemented, for example, within the network environment of FIG. 5. In some embodiments, the processes of FIGS. 7, 7A, and 7B can be implemented within a client (e.g., presenter client 502 of FIG. 5) and, more particularly, within a voice assistance module thereof (e.g., voice assistance module 622 of FIG. 6). In some embodiments, at least a portion of the processing of FIGS. 7, 7A, and 7B can be implemented within a server, such as an application server running in a cloud computing environment.

Turning to FIG. 7, an illustrative process 700 can begin at block 702, where a screen sharing session can be initiated between two or more users. For example, a presenter client (e.g., presenter client 502 of FIG. 5) can initiate a screen sharing with one or more audience member clients (e.g., more audience member clients 504 of FIG. 5) via a screen sharing service (e.g., screen sharing service 506 of FIG. 5). The presenter can choose to share one or more applications, or application windows, with the audience members via screen sharing. The applications which are shared ("screen shared applications"), or application windows associated therewith, may include various UI elements that are visible to the presenter and, by way of the screen sharing, also to the audience members.

At block 704, speech may be received from another client. For example, an audio signal encoding the speech may be received from a remote client (e.g., an audience member client 504 of FIG. 5) over one or more computer networks (e.g., computer networks 508 of FIG. 5). The speech may be captured by a microphone connected to the other client and may include to instructions spoken by a user of the other client during the screen sharing session. The speech may reference a particular UI element of an application/window that is shared. For example, referring to the illustrative application UI of FIG. 4A, the speech may include an instruction such as "click the home menu item" (referring to menu item 402a), "go to the bottom Action" (referring to action button 410d), "click on the Ask HR button" (referring to action button 410c), "find the first rounded button in the Activity Feed" (referring to button 418), "tap the black button" (referring to button 418b), etc. In some cases, the speech may reference an application by name or other application identifier. For example, the speech may include an instruction such as "click the back button in GOOGLE CHROME."

At block 706, the received speech can be transcribed into text. In some embodiments, the transcribed text may correspond to a list of individual words within the speech. For example, if the received speech includes the instruction "click the home tab," the speech may be transcribed into the following word list: ["click," "the," "home,", "tab"]. The speech-to-text conversion can be performed using any existing speech recognition software package or library.

At block 708, a search may be performed to locate/identify one or more application UI elements referenced in the transcribed speech. An illustrative process that can be used to perform such a search is described below in the context of FIG. 7A.

If, at block 710, one or more UI elements are located by the search, then the UI elements may be highlighted at block 712. Examples of techniques that can be used to highlight a UI element are discussed above in the context of FIG. 4B.

The illustrative process 700 may repeat from block 704, as shown. For example, the processing of blocks 704, 706, 708, 710, and 712 may be repeated multiple times during a screen sharing session. In some embodiments, prior to highlighting a UI element at block 712, one or more UI elements that were previously highlighted by process 700 may be unhighlighted, meaning that changes previously made the application UI to highlight the element may be undone. For example, if a border was added to a UI element by block 712, then the border may subsequently be removed when another UI element is highlighted by block 712. In this way, only those UI element(s) most recently referenced by a user's speech will be highlighted.

Turning to FIG. 7A, an illustrative process 720 can be used in conjunction with process 700 of FIG. 7 to search for one or more UI elements referenced in transcribed speech. For example, process 720 may be performed as part of block 708 of FIG. 7.

At block 722, a list of applications that are shared by the client ("screen shared applications") can be enumerated. If the entire screen is shared, then the list of screen shared applications may correspond to a list of applications that are running and visible on a client (e.g., on presenter client 502 of FIG. 5). To determine which applications are running/visible on the client, an API or system call(s) provided by the client's OS can be used for obtaining information about running processes/application. Alternatively, if the client is only sharing particular application(s) or particular application window(s), then the list of known applications may include only those particular applications/windows. In this case, the list of screen shared applications may be obtained, for example, using an API provided by a screen sharing application on the client (e.g., by screen sharing application 618 of FIG. 6). In some embodiments, such an API can also be used to determine if the entire screen is shared or if particular applications/windows are shared.

In some embodiments, enumerating the list of screen shared applications can include excluding applications that are displayed in windows that have a dimension (e.g., a width or height) or a size (e.g., an area) that is below a threshold window dimension/size. In some embodiments, a threshold window size may be defined as a percentage of the client's screen size. For example, applications that are displayed in windows having a size that is less than X % (e.g., less than 5%, 10%, 15%, 20%, 25%, 30%, or 33%) of the screen size may be excluded from the enumerated list of screen shared applications. In some embodiments, applications that are displayed in windows that are hidden/minimized may also be excluded from the from the list of screen shared applications enumerated at block 722.

At block 724, a determination can be made as to whether an application is referenced in the transcribed speech. In some embodiments, a transcribed list of words may be compared to the enumerated list of screen shared applications to determine if any of the screen shared applications is referenced in the speech. In some embodiments, the list of screen shared applications can include a list of application names or other identifiers for the screen shared applications. Here, the transcribed words can be compared (e.g., by comparing individual words and/or combinations of words) to the list of applications names/identifiers to determine if screen shared application is reference in the speech. For example, if the speech includes the instruction "click the back button in GOOGLE CHROME," the individual word "CHROME" or the combination of words "GOOGLE" and "CHROME" (i.e., the phrase "GOOGLE CHROME") can be compared against a list of screen shared applications to determine that the speech references that screen shared application.

In some embodiments, substring matching may be used to determine if an application is referenced in the transcribed speech. For example, if the speech includes the instructions "click on the Notes window" and the NOTEPAD application is being screen shared, the it can be determined that the NOTEPAD application is referenced in the speech based on the presence of the common (case insensitive) substring "note." In some embodiments, fuzzy matching, sometimes referred to as approximate string matching, may be used to determine an application is referenced in the transcribed speech. In some embodiments, if the transcribed speech refers to two or more different screen shared applications (i.e., if there is ambiguity as to which application is referenced in the speech), then the application that has a name/identifier which mostly closely matches the transcribed text may be determined at block 724. For example, if the speech includes the instructions "click save in the Photo app" and both the PHOTOS and PHOTOSHOP applications are being screen shared, the it may be determined that the PHOTOS application is referenced in the speech based because the word "photo" in the speech more closely matches the string "photos" than it does the string "photoshop." Such a determination can be based on one or more metrics, such as the lengths of the strings, the number of letters not in common between the strings, the number of syllables in the strings, etc.

If, at block 726, it is determined a particular application is referenced in the speech, then that application may be used in the subsequent search. That is, a list of so-called "candidate applications" for the search may include (e.g., be initialized to include) only the referenced application, as shown by block 727a. Otherwise, at block 727b, the list of candidate applications can include (e.g., be initialized to include) all of the screen shared applications enumerated at block 722.

At block 728, a list of UI elements associated with the candidate applications can be enumerated. For example, if a candidate application has a UI that is represented using a tree structure (e.g., a DOM in the case web- or HTML-based applications), then enumerating the application's UI elements can include traversing the tree structure (e.g., using a depth-first or breadth-first search to visit the nodes of the tree structure). In some embodiments, WINDOWS AUTOMATION API can be used to enumerate the UI elements of a WINDOWS application. In some embodiments, WEBDRIVER may be used to enumerate the UI elements of a web-based or browser-based application.

At block 730, the transcribed speech can be analyzed to identify one or more UI element attributes that are referenced in the speech. This can include identifying one or more identity attributes, type attributes, style attributes, and/or positional attributes referenced in the speech.

For example, if the speech includes the instructions "click the home menu item" then the word "home" may be identified as an identity attribute referenced in the speech and the phrase "menu item" may be identified as a type attribute referenced in the speech. In some embodiments, a dictionary of UI element types can be used to identify the type attribute. For example, such a dictionary can indicate that the words/phrases "label," "button," "text input," "checkbox," "radio button," "menu item," "scrollbar," "panel," "container," etc. are each type attributes. In some embodiments, the order of the transcribed words can be used to distinguish between different UI element attributes. For example, it can be determined that the word "home" corresponds to an identity attribute for a UI element because it appears before a known type attribute (i.e., "menu item") according to the aforementioned dictionary.

As another example, if the speech includes the instructions "go to the bottom Action," then the word "bottom" maybe identified as a positional attribute referenced in the speech. In some embodiments, a dictionary of positional words/phrases can be used to identify a positional attribute. For example, such a dictionary can indicate that the words/phrases "top," bottom," "top most," "left," "right," "top left," "top right," "bottom left," "bottom right," "top most," "bottom most," "left most," right most," "above," "below", "next to," "adjacent to," "besides," etc. are each position attributes. The word "Action" in this example may be identified as an identity attribute because it follows a known positional attribute (i.e., "bottom") according to the aforementioned dictionary.

As another example, if the speech includes the instructions "tap the black button," then the word "black" may be identified as a style attribute referenced in the speech. In some embodiments, a dictionary of style words/phrases can be used to identify a style attribute. For example, such a dictionary can indicate that various words/phrases such as "black," "white," "light grey," etc. correspond to color-like style attributes, that various other words/phrases such as "round," "rounded," "square," "circle," "circular," "oval," "ovate," etc. correspond to shape-like style attributes, among various other types of style attributes. In this example, the words "button" may be identified as a type attribute using a dictionary of UI element types such as described above.

In some embodiments, one or more UI attributes may be identified based on the presence of corresponding modifier/connector words in the transcribed text. For example, if the speech includes the instruction "click the button named 'save config'," the word "named" may be treated as a modifier/connector that links the type attribute "button" with the identity attribute "save config." In some embodiments, a dictionary of known modifier/connector words can be used for this purpose.

In addition to identifying discrete UI element attributes referenced in the speech, embodiments of the present disclosure can also determine and maintain (e.g., using a graph or other type of data structure) relationships between such attributes during analysis of the transcribed speech. For example, using the aforementioned example of "go to the bottom Action," it can be determined that the position attribute "bottom" relates to (e.g., should be interpreted in relation to) the identity attribute "Action." Such a relationship can be used to locate the referenced UI element, as discussed further below.

At block 732, the enumerated UI elements (from block 728) can be filtered based on the UI element attributes referenced in the transcribed text (identified at block 730). An illustrative process for filtering the enumerated UI elements in this way is described below in the context of FIG. 7B.

If, at block 734, the number of UI elements remaining after the filtering is less than a threshold number of UI elements (e.g., less than 1, 2, or 3), then process 720 can return the remaining UI elements, at block 736. Otherwise, process 720 can return no UI elements, at block 738. In this way, process 720 can prevent an excess number of UI elements from being automatically highlighted in response to a user's speech. For example, if an application/window includes a large number of buttons and an audience member broadly instructs a presenter to "click on the button," the logic of blocks 734, 736, 738 can prevent highlighting the large number of buttons. This can further improve productivity and efficiency. UI elements (if any) returned by blocks 736, 738 of FIG. 7A may correspond to the UI elements found by search block 708 of FIG. 7.

Turning to FIG. 7B, an illustrative process 740 can be used in conjunction with process 720 of FIG. 7A to locate one or more UI elements referenced in transcribed speech by filtering a list of enumerated UI elements associated with a screen shared application. For example, process 740 may be performed as part of block 732 of FIG. 7A. As input, process 740 can receive a list of enumerated UI elements (e.g., the UI elements enumerated at block 728 of FIG. 7A) and UI element attributes referenced in the transcribed speech (e.g., the UI element attributes identified at block 730 of FIG. 7A). In the example of FIG. 7B, four types of attributes are considered: type attributes, identity attributes, positional attributes, and style attributes. These are merely non-limiting examples of attributes that can be considered when locating and highlight UI elements according to the present disclosure.

If, at block 742, a type attribute is referenced in the speech, then the list of enumerated UI elements can be filtered by the type attribute, at block 744. For example, if the type attribute is <button>, then any UI element that is not a button may be removed from the list of UI elements.

If, at block 746, an identity attribute is referenced in the speech, then the list of enumerated UI elements can be filtered by the identity attribute, at block 748. For example, if the identity attribute corresponds to a "name" attribute with the value "Ask HR" (e.g., name="Ask HR") then any UI element that does not have the same "name" attribute value may be removed from the list of UI elements.

If, at block 750, if one or more positional attributes are referenced in the speech, then the list of enumerated UI elements can be filtered by the positional attribute(s), at block 752. For example, if a positional attribute corresponds to "bottom" then any UI elements that are not in a bottom position (e.g., relative to a parent/ancestor UI element) may be removed from the list of UI elements. In some embodiments, relationships between UI element identified in the speech may be considered here. For example, if the speech includes the instructions "go to the bottom Action," then a relationship between the positional attribute "bottom" and the identity attribute "Action" may be identified (e.g., at block 730 of FIG. 7A). This relationship may be considered when filtering the list of UI elements by positional attributes at block 754. For example, referring to FIG. 4A, when considering whether to remove the button 410*d* from the UI list, the relative position of button 410*d* within the action list 404*b* (which itself can be identified based on the related "Action" identity attribute) may be considered. In this example, button 410*d* would not be removed because it is the bottommost button within the action list 404b. On the other hand, buttons 410a-410c would be removed (i.e., filtered out) in this example.

If, at block 754, if one or more style attributes are referenced in the speech, then the list of enumerated UI elements can be filtered by style positional attribute(s), at block 756. For example, if a positional attribute corresponds to the color "black," then any UI elements that are that are not black (e.g., do not have a foreground or background color that is black) may be removed from the list of UI elements. In some embodiments, a mapping/library/database of commonly used color names may be used to convert a color name referenced in the speech (e.g., "black") into a numerical color value (e.g., a hexadecimal value such as #000000). The resulting numerical color value can then be compared again numerical color values of the enumerated UI elements during the filtering of block 754. In some embodiments, a similarity metric can be calculated between two numeric color values to determine how similar the colors are (e.g., in terms of on-screen appearance). Any known technique for calculating a similarity metric between color values can be used. Block 754 can determine if a color referenced in the speech is similar to a color of given one of the application UI elements by comparing the similarity score to a threshold value. If the colors are not similar, then the UI element can be removed from the list of UI elements.

In some embodiments, when deciding whether to remote a particular UI element from the list, the UI element's ancestor and/or descendant UI elements may also be considered. For example, referring to FIG. 4A, if the speech includes the instruction "click the Ask HR button," then the button 410c may satisfy the type attribute "button" but not the identity attribute "Ask HR" (because "Ask HR" is the identity of label 422, not of button 410c). In such situations, to avoid erroneously filtering out UI elements referenced in speech, ancestor and/or descendant UI elements may also be considered when filtering in blocks 744, 748, 752, 756.

At block 758, the remaining UI elements (i.e., the enumerated UI elements not filtered out by blocks 744, 748, 752, 756) may be returned by process 740. UI elements (if any) returned by block 758 of FIG. 7B may correspond to the UI elements output by block 732 of FIG. 7A.

The following examples pertain to further embodiments, from which numerous permutations and configurations will be apparent.

Example 1 includes a method including: receiving, by a client device, speech of a user during a screen sharing session; transcribing, by the client device, the speech into text; analyzing, by the client device, the text to identify one or more UI elements referenced within the speech, the one or more UI elements visible within the screen sharing session; and highlighting the one or more UI elements visible on the client device.

Example 2 includes the subject matter of Example 1, wherein the speech is received from a remote client device during the screen sharing session.

Example 3 includes the subject matter of Example 1 or 2, and further includes: enumerating a plurality of applications visible within the screen sharing session, wherein the analyzing includes searching one or more of the plurality of applications for the one or more UI elements referenced within the speech.

Example 4 includes the subject matter of Example 3, and further includes: determining that a first application from the plurality of applications is referenced within the speech, wherein the searching includes searching only the first application.

Example 5 includes the subject matter of Example 3 or 4, and further includes: determining that no application from the plurality of applications is referenced within the speech wherein the searching includes searching each of the plurality of applications.

Example 6 includes the subject matter of any of Examples 3 to 5, wherein enumerating the plurality of applications visible within the screen sharing session includes excluding applications that have a window size less than a threshold window size.

Example 7 includes the subject matter of any of Examples 3 to 6, wherein the analyzing includes: enumerating UI elements of the one or more of the plurality of applications; and identifying one or more UI element attributes referenced in the speech, wherein the searching includes filtering the enumerated UI elements based on the one or more UI element attributes referenced in the speech.

Example 8 includes computing device including a processor and a memory storing computer program code that when executed on the processor causes the processor to execute a process. The process includes: receiving speech of a user during a screen sharing session; transcribing the speech into text; analyzing the text to identify one or more UI elements referenced within the speech, the one or more UI elements visible within the screen sharing session; and highlighting the one or more UI elements visible on the client device.

Example 9 includes the subject matter of Example 8, wherein the speech is received from a remote computing device during the screen sharing session.

Example 10 includes the subject matter of Example 8 or 9, the process further including: enumerating a plurality of applications visible within the screen sharing session, wherein the analyzing includes searching one or more of the plurality of applications for the one or more UI elements referenced within the speech.

Example 11 includes the subject matter of Example 10, the process further including: determining that a first application from the plurality of applications is referenced within the speech, wherein the searching includes searching only the first application.

Example 12 includes the subject matter of Example 10 or 11, the process further including: determining that no application from the plurality of applications is referenced within the speech, wherein the searching includes searching each of the plurality of applications.

Example 13 includes the subject matter of any of Examples 10 to 12, wherein the enumerating of the plurality of applications visible within the screen sharing session includes excluding applications that have a window size less than a threshold window size.

Example 14 includes the subject matter of any of Examples 10 to 13, wherein the analyzing includes: enumerating UI elements of the one or more of the plurality of applications; and identifying one or more UI element attributes referenced in the speech, wherein the searching includes filtering the enumerated UI elements based on the one or more UI element attributes referenced in the speech.

Example 15 includes a non-transitory machine-readable medium encoding instructions that when executed by one or more processors cause a process to be carried out, the process comprising: receiving, by a client device, speech of a user during a screen sharing session; transcribing, by the client device, the speech into text; analyzing, by the client device, the text to identify one or more UI elements referenced within the speech, the one or more UI elements visible within the screen sharing session; and highlighting the one or more UI elements visible on the client device.

Example 16 includes the subject matter of Example 15, wherein the speech is received from a remote client device during the screen sharing session.

Example 17 includes the subject matter of Example 15 or 16, the process further comprising: enumerating a plurality of applications visible within the screen sharing session, wherein the analyzing includes searching one or more of the plurality of applications for the one or more UI elements referenced within the speech.

Example 18 includes the subject matter of any of Examples 16 to 17, the process further comprising: determining that a first application from the plurality of applications is referenced within the speech, wherein the searching includes searching only the first application.

Example 19 includes the subject matter of any of Examples 16 to 18, the process further comprising: determining that no application from the plurality of applications is referenced within the speech, wherein the searching includes searching each of the plurality of applications.

Example 20 includes the subject matter of any of Examples 16 to 19, wherein the analyzing includes: enumerating UI elements of the one or more of the plurality of applications; and identifying one or more UI element attributes referenced in the speech, wherein the searching includes filtering the enumerated UI elements based on the one or more UI element attributes referenced in the speech.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
   receiving, by a client device, speech of a user during a screen sharing session;
   transcribing, by the client device, the speech into text;
   enumerating a plurality of applications visible within the screen sharing session;
   analyzing, by the client device, the text to identify one or more UI elements referenced within the speech, the one or more UI elements visible within the screen sharing session; and
   highlighting the one or more UI elements visible on the client device,
   wherein the analyzing includes searching one or more of the plurality of applications for the one or more UI elements referenced within the speech.

2. The method of claim 1, wherein the speech is received from a remote client device during the screen sharing session.

3. The method of claim 1, further comprising:
   determining that a first application from the plurality of applications is referenced within the speech,
   wherein the searching includes searching only the first application.

4. The method of claim 1, further comprising:
   determining that no application from the plurality of applications is referenced within the speech,
   wherein the searching includes searching each of the plurality of applications.

5. The method of claim 1, wherein enumerating the plurality of applications visible within the screen sharing session includes excluding applications that have a window size less than a threshold window size.

6. The method of claim 1, wherein the analyzing includes:
   enumerating UI elements of the one or more of the plurality of applications; and
   identifying one or more UI element attributes referenced in the speech,
   wherein the searching includes filtering the enumerated UI elements based on the one or more UI element attributes referenced in the speech.

7. A computing device comprising:
   a processor; and
   a memory storing computer program code that when executed on the processor causes the processor to execute a process including:
      receiving speech of a user during a screen sharing session;
      transcribing the speech into text;
      enumerating a plurality of applications visible within the screen sharing session;
      analyzing the text to identify one or more UI elements referenced within the speech, the one or more UI elements visible within the screen sharing session; and
      highlighting the one or more UI elements visible on the client device,
      wherein the analyzing includes searching one or more of the plurality of applications for the one or more UI elements referenced within the speech.

8. The computing device of claim 7, wherein the speech is received from a remote computing device during the screen sharing session.

9. The computing device of claim 7, the process further including:
   determining that a first application from the plurality of applications is referenced within the speech,
   wherein the searching includes searching only the first application.

10. The computing device of claim 7, the process further including:
    determining that no application from the plurality of applications is referenced within the speech,
    wherein the searching includes searching each of the plurality of applications.

11. The computing device of claim 7, wherein the enumerating of the plurality of applications visible within the screen sharing session includes excluding applications that have a window size less than a threshold window size.

12. The computing device of claim 7, wherein the analyzing includes:
    enumerating UI elements of the one or more of the plurality of applications; and
    identifying one or more UI element attributes referenced in the speech,
    wherein the searching includes filtering the enumerated UI elements based on the one or more UI element attributes referenced in the speech.

13. A non-transitory machine-readable medium encoding instructions that when executed by one or more processors cause a process to be carried out, the process comprising:
    receiving, by a client device, speech of a user during a screen sharing session;
    transcribing, by the client device, the speech into text;
    enumerating a plurality of applications visible within the screen sharing session;
    analyzing, by the client device, the text to identify one or more UI elements referenced within the speech, the one or more UI elements visible within the screen sharing session; and
    highlighting the one or more UI elements visible on the client device,
    wherein the analyzing includes searching one or more of the plurality of applications for the one or more UI elements referenced within the speech.

14. The machine-readable medium of claim 13, wherein the speech is received from a remote client device during the screen sharing session.

15. The machine-readable medium of claim 13, the process further comprising:
    determining that a first application from the plurality of applications is referenced within the speech,
    wherein the searching includes searching only the first application.

16. The machine-readable medium of claim 13, the process further comprising:
    determining that no application from the plurality of applications is referenced within the speech,
    wherein the searching includes searching each of the plurality of applications.

17. The machine-readable medium of claim 13, wherein the analyzing includes:
- enumerating UI elements of the one or more of the plurality of applications; and
- identifying one or more UI element attributes referenced in the speech,
- wherein the searching includes filtering the enumerated UI elements based on the one or more UI element attributes referenced in the speech.

\* \* \* \* \*